Patented May 16, 1950

2,507,512

UNITED STATES PATENT OFFICE 2,507,512

MONOFUNCTIONAL POLYSILAHYDROCARBONS AND THEIR PRODUCTION

John T. Goodwin, Jr., Pittsburgh, Pa., assignor to Dow Corning Corporation, Midland, Mich., a corporation of Michigan No Drawing. Application April 20, 1948, Serial No. 22,253. In Great Britain July 1, 1947

14 Claims. (Cl. 260—448.2)

The present invention relates to the production of polymeric fluids which have the fundamental repeating structure —$CH_2SiR_2$— and to the fluids so produced.

In the history of the organosilicon compounds, two principal types of compounds containing more than one silicon atom have heretofore been described. In one of these types, the silicon atoms are linked directly to each other. These are the so-called polysilanes, heretofore described by Kipping. The present organosilicon industry is based upon the siloxanes, which are materials in which the silicon atoms are linked through oxygen atoms. There has been some mention in the literature heretofore of organosilicon halides containing a plurality of silicon atoms in which the silicon atoms are linked by large divalent organic radicals and the remaining valences of the silicon atoms are satisfied by chlorine.

Objects of the present invention are to produce organosilicon compounds in which the silicon atoms are linked through methylene bridges.

In accordance with the process of the present invention compounds of this type are produced by reacting a compound of the type $XCH_2SiR_2Y$ and a compound of the type $R_3Si(CH_2SiR_2)_nY'$ by contacting the former with an alkali metal in the presence of the latter compound. By this method compounds of the above indicated type are produced. In the type formulae X represents a halogen, preferably chlorine or bromine, R represents monovalent hydrocarbon radicals bonded to the silicon by carbon to silicon bonding. Y represents alkoxyl or halogen, preferably ethoxyl, chlorine or bromine, Y' represents halogen, preferably chlorine or bromine, and $n$ is an integer.

The compounds produced by this method are of the type $R_3Si(CH_2SiR_2)_mY$ where R represents monovalent hydrocarbon radicals, $m$ represents a positive integer, and Y represents alkoxyl or halogen. This preferential reaction is not the necessary result, since a Wurtz reaction might be expected to occur between the halogenomethyl radicals to produce ethylenic linkages between silicon atoms. Also in connection with halogen atoms bonded to the silicons, it might be expected that a disilane type of linkage would result. However, it has been found that the two components interact preferentially in the manner indicated to the exclusion of other types of reaction.

The reaction is conducted by contacting the alkali metal and the silicon derivatives with the latter in liquid phase. Thus, it is possible to add the alkali metal in cut pieces to a mixture of the reactants at room temperature or at somewhat elevated temperature. In this case the reaction proceeds relatively slowly unless the temperature is elevated to above the melting point of the alkali metal. A preferred method of conducting the reaction is to suspend the alkali metal in a hydrocarbon boiling above the melting point of the alkali metal. The suspension is maintained at a temperature above the melting point of the alkali metal. The organic reactants may then be added to the suspension of alkali metal either in mixture or by adding the compound of the type $$R_3Si(CH_2SiR_2)_nY'$$

first and then adding the other reactant.

The reactants may be interacted in equimolecular amounts. An excess of the compound $R_3Si(CH_2SiR_2)_nY'$ does not modify the course of the reaction and the excess may be recovered from the product. In case of an excess of the other material, $XCH_2SiR_2Y$, the effect is to increase the molecular weight of the product obtained by the interaction of the two, depending upon the relative amounts present.

The reactant of the type $XCH_2SiR_2Y$ may be made in a variety of ways.

Thus, in the case of chloromethyl dimethyl silicon chloride, this material may be produced by the direct chlorination of trimethyl silicon chloride as described in the literature. The equivalent ester may be produced by the substitution of an alkoxyl radical for the chlorine radical by reacting the above chloride with the desired alcohol. Alternatively, these same materials may be produced by chlorinating methyl silicon trichloride to give chloromethyl silicon trichloride, which may then be reacted with a methyl Grignard reagent to give the chloromethyl dimethyl silicon chloride. In case other hydrocarbon radicals than methyl radicals are desired, the latter of the above methods may be employed. That is, the chloromethyl silicon trichloride may be reacted with other Grignard reagents than methyl Grignard, as for instance, with an ethyl Grignard or higher alkyl Grignard, such as octadecyl Grignard. Likewise, in this process, aryl groups can be substituted by the use of appropriate Grignards, such as phenyl Grignard.

The compounds of the type $R_3Si(CH_2SiR_2)_nY'$, include the triorgano silicon halides, since $n$ may equal zero. These triorgano silicon halides have been described frequently in the literature. When any of these is interacted in accordance with the process hereof, compounds of the type where $n$ is greater than zero are obtained. The principal yield from this interaction is the material in which $n$ equals 1, though there is obtained a yield of materials in which $n$ is increased more than 1 unit. The products of this interaction may be then again reacted with the compound of the type $XCH_2SiR_2Y$. By successive interaction as described and in accordance with the present invention, fluids of increasing molecular weight are obtained.

The fluids obtained in accordance with the present invention, as above described, may be hydrolyzed and condensed whereby there is introduced into each molecule one siloxane linkage. Thus when this method is employed in connection with the first member of the series of products in which the organic radicals are methyl radicals, the following product is obtained:

Alternatively the compounds hereof may be reacted with a Grignard reagent, such as methyl Grignard reagent, to substitute a methyl or other hydrocarbon radical for the residual chlorine or ethoxyl which is linked to the silicon. Likewise, this end of the molecule may be blocked by reacting the materials so produced with a chloromethyl trihydrocarbonyl silane using an alkali metal to effect the interaction. Thus, when this method is employed in connection with the first member of the series of products in which the organic radicals are methyl radicals, the following product is obtained:

The products directly obtained from the process of the present invention are of utility as agents for making non-water-repellent materials hydrophobic. The particular desirability of these materials for this purpose is due to the polar group on one end of each molecule. The products derived by hydrolyzing the products of the process hereof and by end-blocking with organic radicals as above described are of utility as diffusion pump fluids, hydraulic fluids, damping fluids, lubricating greases and oils, and as electrical insulating materials.

Examples

*Example 1.*—A mixture of 217 parts by weight of $(CH_3)_3SiCl$ and 305 parts of

was added to a dispersion of 92 parts of sodium in 800 parts of toluene at a temperature of 110° C. under reflux. The addition was made at a rate sufficiently low that the heat of reaction was removed by the coolant in the reflux condenser. The reaction mixture was cooled and filtered. Upon distillation 298 parts of a material was obtained which was identified as

This boiled at 161° C. at 740 mm. This is a yield of 78.5%. The residue from this run was combined with the residues of other similar runs and upon distillation there was obtained a yield of material identified as

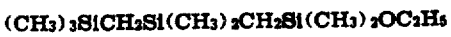

This material boils at 226° C. at 740 mm. This distillation was made at 50 mm. At this pressure the second member of the series boils at 135° C. The distillation was continued and the boiling range and refractive index showed that the third member of the series was contained in the distillate. The residue appeared to contain higher members of the series. By substituting $ClCH_2Si(CH_3)_2Cl$ for the equivalent ester the yield of the first member of the series would be reduced and the yields of the higher members increased. In this instance of course, the products obtained are chlorides instead of esters.

*Example 2.*—The compound

was converted to the equivalent chloride having the formula $(CH_3)_3SiCH_2Si(CH_3)_2Cl$ by reaction with acetyl chloride. 152.5 parts by weight of $ClCH_2Si(CH_3)_2OC_2H_5$ was added to 170 parts of the above chloride in 160 parts of toluene containing 46 parts of sodium dispersed therein. The temperature was raised to 110° C. prior to the addition to melt and effect dispersion of the sodium. The addition was made at a rate to allow total reflux with the amount of cooling available. The reaction mixture was cooled and filtered. The filtrate was distilled. There was thereby obtained a yield of 162.2 parts of a product identified as

which boiled at 226° C. at 740 mm. A high boiling residue was obtained comparable to that obtained in Example 1.

*Example 3.*—The product of Example 2 was converted to the analogous chloride by reaction with acetyl chloride. 631 parts by weight of this chloride. 115 parts sodium, 381 parts of

were reacted in the same manner as in Example 2 in the presence of 1200 parts of toluene. Upon distillation 528 parts of a fluid were obtained which was identified as

which boils at 159° C. at 23 mm.

By hydrolysis and condensation of the products described in Examples 1 to 3 there are obtained materials of the formula

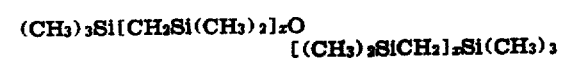

where $x$ is 1, 2 or 3. Higher members of this series may be prepared by continuing the series of reactions represented by Examples 1 to 3 and hydrolyzing the products.

By reacting the products of Examples 1 to 3 with methyl Grignard there are obtained materials of the formula

where $x$ is 1, 2 or 3. Likewise higher members of this series may be obtained as indicated.

The properties of the materials herein discussed are indicated below:

| | B. P. at 740 mm. | $d_{25}$ | $n_d^{25}$ | Per Cent Si | Sp. Ref.[1] Found | Sp. Ref.[1] Calc. |
|---|---|---|---|---|---|---|
| $(CH_3)_3SiCH_2Si(CH_3)_2OEt$ | 161 | .8060 | 1.4146 | 29.6 | .3100 | .3115 |
| $(CH_3)_3Si[CH_2Si(CH_3)_2]_2OEt$ | 226 | .8248 | 1.4360 | 32.0 | .3130 | .3155 |
| $(CH_3)_3Si[CH_2Si(CH_3)_2]_3OEt$ | [2] 159 | .8521 | 1.4501 | 33.5 | .3155 | .3190 |
| $(CH_3)_3SiCH_2Si(CH_3)_2Cl$ | 154.5 | .8662 | 1.4277 | 30.8 | .2960 | .2950 |
| $(CH_3)_3Si[CH_2Si(CH_3)_2]_2Cl$ | 226.5 | .8868 | 1.4502 | 33.1 | .3024 | .3045 |
| $(CH_3)_3SiCH_2Si(CH_3)_3$ | 132.8 | .7504 | 1.4154 | 34.2 | .3362 | .3362 |
| $(CH_3)_3Si[CH_2Si(CH_3)_2]_2CH_3$ | 208 | .7990 | 1.4403 | 36.0 | .3310 | .3330 |

[1] Molar refraction based on paper by E. L. Warrick JACS, 68, 2455 (1946).
[2] At 23 mm.

*Example 4.*—46 parts of sodium and 310 parts of toluene were heated in a reaction vessel to 110° C. to melt the sodium. A mixture of 170.5 parts of chloro(dimethyl)-phenylsilane and 152.5 parts of chloromethylethoxydimethylsilane were added to the toluene-sodium mixture at a rate that the temperature was maintained at 100 to 110° C. with the cooling available. After addition of all of this mixture, the reaction mixture was maintained at 110° C. for 1.5 hours. The reaction product was filtered to separate the salt and the toluene was stripped from the product. The residue was distilled under vacuum. A forecut of chlorodimethylphenylsilane was obtained. The product, $C_6H_5(CH_3)_2SiCH_2Si(CH_3)_2OC_2H_5$, was obtained in 43.5 per cent of theoretical yield. The product boils at 144° C. at 23.5 mm. and at 25° C. has an index of refraction of 1.4839 and density of 0.9152. Analytical data established that the product was the compound indicated. 44 grams of the product were mixed with 100 ml. of water containing 10 per cent sulfuric acid by volume. The mixture was refluxed for 24 hours. The oily layer was separated, washed, and diluted with benzene in order to remove the water upon distillation. The silanol, formed by hydrolysis, condensed during the course of hydrolysis and was obtained from the distillation in which the benzene and water were separated. This disiloxane which has the formula $[C_6H_5(CH_3)_2SiCH_2Si(CH_3)_2]_2O$ was found to boil at 197.8° C. at 1.8 mm. and at 25° C. had an index of refraction of 1.5107 and a density of 0.9548. Analysis shows it to be the indicated compound. This compound is of a boiling point suitable for use as a diffusion pump fluid.

*Example 5.*—95 parts of the first compound in the table of Example 3 was reacted with 116 parts of normal butyl acetate in the presence of two parts of silicon tetrachloride as a catalyst. The mixture was refluxed with the temperature being controlled to allow the escape of ethyl acetate. The product was then distilled and was found by analysis to be 2-butoxy-2,4,4-trimethyl-2,4-disilapentane, the butoxy analogue of the starting material. This compound boils at 198.5° C. at 740 mm., has a density of 25° C. of 0.812 and an index of refraction of 1.4211.

*Example 6.*—A mixture of 85 parts of $(CH_3)_2C_6H_5SiCl$ and 107 parts of $ClCH_2SiC_6H_5CH_3OC_2H_5$ was dropped into 23 parts of molten sodium and 240 parts of toluene at such a rate that the reaction temperature was maintained at 100–110° C. After all the reactants had been added, the mixture was maintained at 100–110° C. for one hour. The products were then cooled, filtered, the salts were washed with toluene, the washings were added to the filtrate and the combined liquids were stripped of toluene. The residue from the stripping operation was fractionally distilled and yielded 82 parts of $(CH_3)_2C_6H_5SiCH_2SiCH_3C_6H_5OC_2H_5$ This material has the properties, $(n)_D^{25}$ 1.5314, density at 25° C. of 0.984, boiling point 207° C. at 24 mm. The residue contained higher members of the same series of compounds. The compound so prepared was hydrolyzed by refluxing it with one-fifth of its weight of sulfuric acid for 16 hours. An oily material of the composition $[(CH_3)_2C_6H_5SiCH_2SiCH_3C_6H_5]_2O$ was obtained which was non-distillable at 200° C. at 3 mm. absolute pressure. This product is an excellent lubricant.

*Example 7.*—A mixture of 59 parts of $(CH_3)_2C_6H_5SiCl$ and 62 parts of $ClCH_2SiCH_3C_4H_9OC_2H_5$ was dropped into a flask containing 15 parts of sodium and 200 parts of toluene which had been heated until the sodium was melted. The halides were added at such a rate that the reaction temperature was maintained at 100–110° C. After all the reactants had been added, the materials were maintained at 100–110° C. for one hour. The products were then cooled, filtered, the salts were washed with toluene, the washings were added to the filtrate and the combined liquids were stripped of toluene. The residue from the stripping operation was fractionally distilled and yielded 55 parts of the compound $(CH_3)_2C_6H_5SiCH_2SiCH_3C_4H_9OC_2H_5$ This material had the properties, $(n)_D^{25}$ 1.4948, density at 25° C. of 0.9177, boiling point 184° C. at 25 mm. The compound so prepared was hydrolyzed by refluxing it with one-fifth of its weight of sulfuric acid for 16 hours. An oily material of the composition $[(CH_3)_2C_6H_5SiCH_2SiCH_3C_4H_9]_2O$ was obtained which was non-distillable at 200° C. at 3 mm. absolute pressure. This product is an excellent lubricant.

That which is claimed is:
1. Compositions of the general formula $R_3Si[CH_2SiR_2]_mY$ in which R is a radical of the group consisting of phenyl and alkyl, Y represents a substituent of the group alkoxy and halogen, and $m$ represents a positive integer.

2. Compositions in accordance with claim 1 in which R represents methyl.

3. $(CH_3)_3SiCH_2Si(CH_3)_2Y$, where Y is a substituent of the group consisting of alkoxy and halogen.

4. $(CH_3)_3Si[CH_2Si(CH_3)_2]_2Y$, where Y is a substituent of the group consisting of alkoxy and halogen.

5. $(CH_3)_3Si[CH_2Si(CH_3)_2]_3Y$, where Y is a substituent of the group consisting of alkoxy and halogen.

6. $C_6H_5(CH_3)_2SiCH_2Si(CH_3)_2Y$ in which Y is a substituent of the group consisting of alkoxy and halogen.

7. $C_6H_5(CH_3)_2SiCH_2Si(CH_3)_2OC_2H_5$.

8. Compositions of the formula
$C_6H_5(CH_3)_2Si[CH_2SiC_6H_5]_mY$ in which $m$ is a positive integer and Y is a substituent of the group consisting of alkoxy and halogen.

9. $C_6H_5(CH_3)_2SiCH_2SiC_6H_5CH_3Y$ in which Y is a substituent of the group consisting of alkoxy and halogen.

10. The method which comprises reacting an alkali metal with a compound of the type $XCH_2SiR_2Y$ in mixture with a compound of the type $R_3Si(CH_2SiR_2)nY$ in which X represents halogen, Y represents a substituent of the group consisting of alkoxy and halogen, $n$ is an integer equal to at least 0, and R represents a radical of the group consisting of phenyl and alkyl.

11. The method in accordance with claim 10 in which $n$ equals 0.

12. The method in accordance with claim 10 in which R represents methyl.

13. The method which comprises reacting an alkali metal with $ClCH_2(CH_3)_2SiOC_2H_5$ in mixture with $(CH_3)_2C_6H_5SiCl$ whereby there is produced 2 - ethoxy - 2,4 - dimethyl - 4 - phenyl - 2,4-disilapentane.

14. The method which comprises reacting $$ClCH_2CH_3C_6H_5SiOC_2H_5$$

in mixture with $C_6H_5(CH_3)_2SiCl$ whereby there is produced 2 - ethoxy - 4 - methyl - 2,4 - diphenyl - 2,4-disilapentane.

JOHN T. GOODWIN, JR.

REFERENCES CITED

The following references are of record in the file of this patent:

UNITED STATES PATENTS

| Number | Name | Date |
|---|---|---|
| 2,352,974 | Rochow | July 4, 1944 |
| 2,444,858 | Speier | July 6, 1948 |
| 2,452,895 | Bluestein | Nov. 2, 1948 |

OTHER REFERENCES

Sommer et al.: "Jour. Am. Chem. Soc.," vol. 69 (1947), page 980.

Goodwin: "Jour. Am. Chem. Soc.," vol. 69 (1947), page 2247.